US005326122A

United States Patent [19]

Duffy

[11] Patent Number: 5,326,122

[45] Date of Patent: Jul. 5, 1994

[54] BICYCLE CHEST SUPPORT

[76] Inventor: Paul V. Duffy, 296 West St., Needham, Mass. 02194

[21] Appl. No.: 956,247

[22] Filed: Oct. 5, 1992

[51] Int. Cl.[5] .................. B62K 19/40

[52] U.S. Cl. .................. 280/288.4; 280/290; 74/551.1; 74/551.8

[58] Field of Search .................. 280/288.4, 290, 293; 74/551.1, 551.8, 551.9

[56] References Cited

U.S. PATENT DOCUMENTS

| | | | |
|---|---|---|---|
| 588,881 | 8/1897 | Roberts | 280/288.4 |
| 626,736 | 6/1899 | Taulbee | 74/511.8 X |
| 944,932 | 12/1909 | Abraham | 74/551.8 |
| 2,229,778 | 1/1941 | Taulbee | 280/290 |
| 4,411,443 | 10/1983 | Pollard | 280/288.1 |
| 4,750,754 | 6/1988 | Lennon | 280/288.4 X |
| 5,163,339 | 11/1992 | Giard, Jr. et al. | 74/551.1 X |

FOREIGN PATENT DOCUMENTS

| | | | |
|---|---|---|---|
| 1159826 | 6/1985 | U.S.S.R. | 280/288.4 |

*Primary Examiner*—Margaret A. Focarino
*Assistant Examiner*—C. Mattix
*Attorney, Agent, or Firm*—William Nitkin

[57] ABSTRACT

A bicycle chest support movable between a first position under the bicyclist's chest and to a second non-use position away from under the bicyclist, such structure having a chest support member pivotally mounted on an adjustable support column which in turn is pivotally mounted on the bicycle's handle stem.

2 Claims, 4 Drawing Sheets

66
50
38
28
24
16
14
12
18
17
68

68
66
50
38
14
18
17
28
24
12
16

BICYCLE CHEST SUPPORT

BACKGROUND OF THE INVENTION

1. Field of the Invention

The device of this invention resides in the field of bicycles and more particularly relates to a device for supporting the chest of a bicyclist when riding a bicycle.

2. Description of the Prior Art

Bicycles with handles that curve downward for grasping enable a bicyclist to position his/her body in a low, aerodynamic position. Bicycle accessories referred to as Aerobars have been developed to enable a bicyclist to remain in such low position with elbows resting on supports and with a projection extending forward which the bicyclist can grasp for steering control. Maintaining a low, aerodynamic position for long periods of time is difficult for a bicyclist and causes the rider's shoulders to hunch upwards, causing tension and strain in the back and torso of the rider. Fatigue builds up over time in the bicyclist who supports his body on either handlebars or on Aerobars.

SUMMARY OF THE INVENTION

It is an object of this invention to provide a bicycle chest support disposed under the rider's sternum and clavicle area to support the torso of the rider. It is to solve the back fatigue problem discussed above that the bicycle chest support of this invention has been developed.

The device of this invention is pivotally attached to the handle support stem of a bicycle. The device can be rotated into position directly under the bicyclist's chest such that the bicyclist can rest his/her chest directly on the chest support of this invention which support relieves the strain on the rider's arms, wrists, torso and back. Such support significantly increases a bicyclist's ability to stay in a low, aerodynamic position without fatigue for speed and/or long distance cycling. The device allows the bicyclist to significantly improve the characteristics of his/her speed or distance cycling due to the fact that the bicyclist is able to take the weight off his/her wrists and arms for long periods of time by supporting his/her body weight on the chest support of this invention. Supporting the bicyclist's body at the area of the chest around the sternum and clavicle further helps prevent any interference with breathing since there is no pressure lower on the chest. The device can be used either with or without an Aerobar. The use of the device prevents hunching of the shoulders that occurs when using Aerobars or traditional handlebars because use of the device prevents movement of the body downward with the shoulders then hunched upwards while the forearms under the elbows are supported by such Aerobars or while the hands are grasping traditional handlebars. The chest support of this invention supports the torso of the bicyclist, thereby helping to provide better posture and more comfort to the bicyclist. The device of this invention is especially useful for the bicyclist cycling at high speeds when aerodynamic characteristics are especially critical.

The device includes a chest support member which is pivotally mounted on a support column. The support column is in turn pivotally mounted to the handle support stem and can be swung out of the way when not in use. The support column includes an adjustable stop member which rests against the handle stem. The adjustment of the stop member will raise or lower the chest support member. The stop member is biased against the handle support stem to position the support column in the desired location for the individual requirements of each rider. The top of the support column can have a column section which is adjustable in height to position the chest support at a desired height for each bicyclist. At the top of the support column is the pivotally mounted support bracket which in turn supports a cushioned chest support member.

In use, the bicyclist maneuvers the chest support of this device into its operative position where the stop member rests against the handle support stem such that the chest support member is disposed under the sternum/clavicle area of the rider who leans forward, placing his/her weight upon the chest support member. The chest support in one embodiment is designed for use by both men and women and will support the Weight of the bicyclist thereon because of its sturdy construction. When not in use, the support column can be pivoted forward by hand, lifting the stop member off the handle support stem and rotating the structure on its lower pivot so that the chest support member moves out of the way. For example, in order for the bicyclist to place his feet on the ground, the bicyclist would sit upright on the bicycle seat, would lift his/her chest off the chest support member and would move the chest support member forward, rotating it out of the way so that the bicyclist could then move forward off the seat, enabling his/her feet to contact the ground. The bicyclist would then be standing in the area that was previously occupied by the chest support of this invention when in its operative mode. When the bicyclist wishes to remount and ride his bicycle, then he would quickly rotate the chest support member back by hand with its adjustable stop member striking the handle support stem positioning the support column in the preadjusted location such that the chest support member would come to rest directly under the bicyclist's chest when the bicyclist leans forward in a "tuck" position on the device of this invention.

DESCRIPTION OF THE PREFERRED EMBODIMENT(S)

Figure 1:
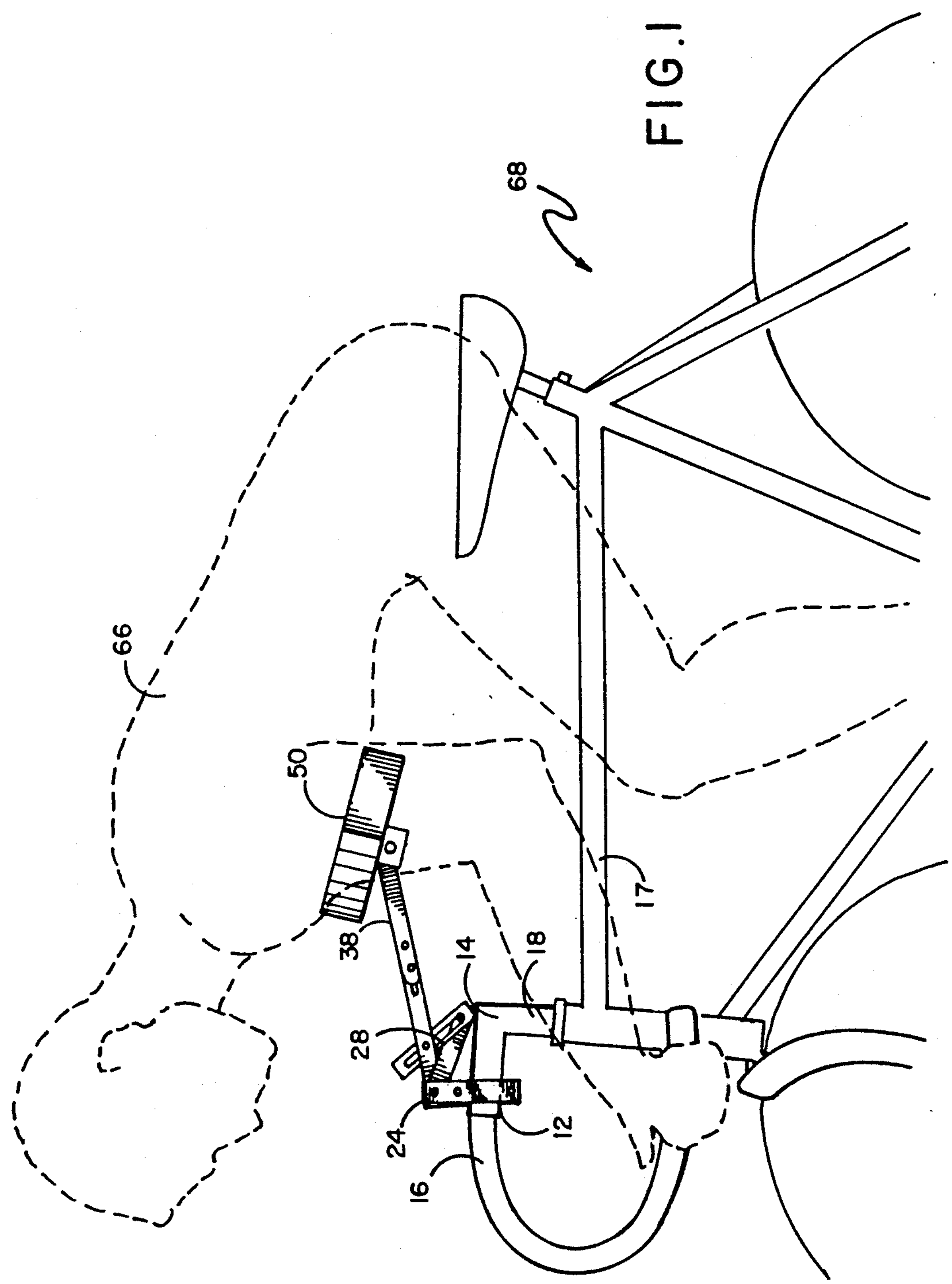
FIG. 1 illustrates a side view of a portion of a bicycle with the chest support of this invention mounted thereon, showing the bicyclist in outline.
Figure 2:
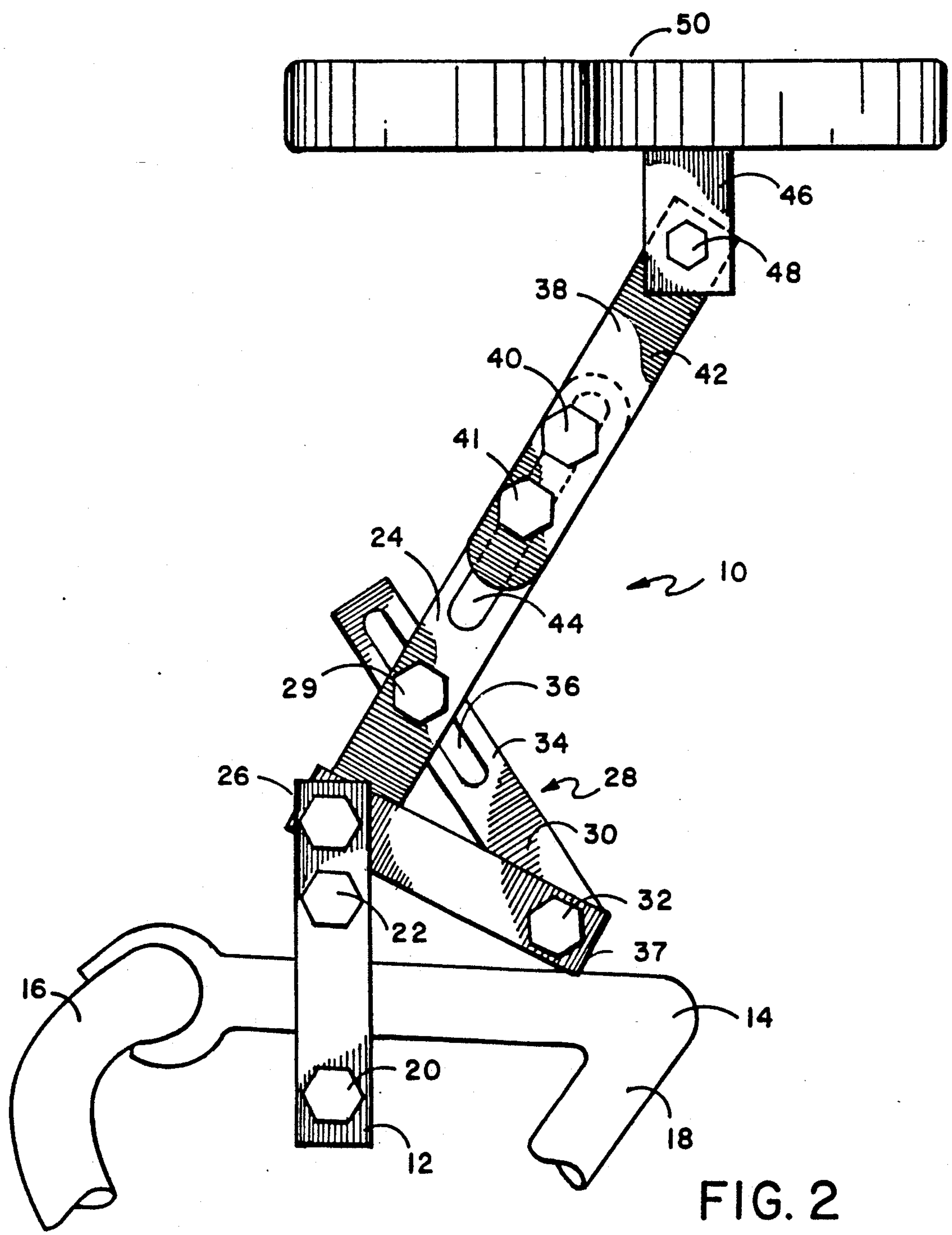
FIG. 2 illustrates an enlarged side view of the device of this invention on a bicycle handle stem.
Figure 4:
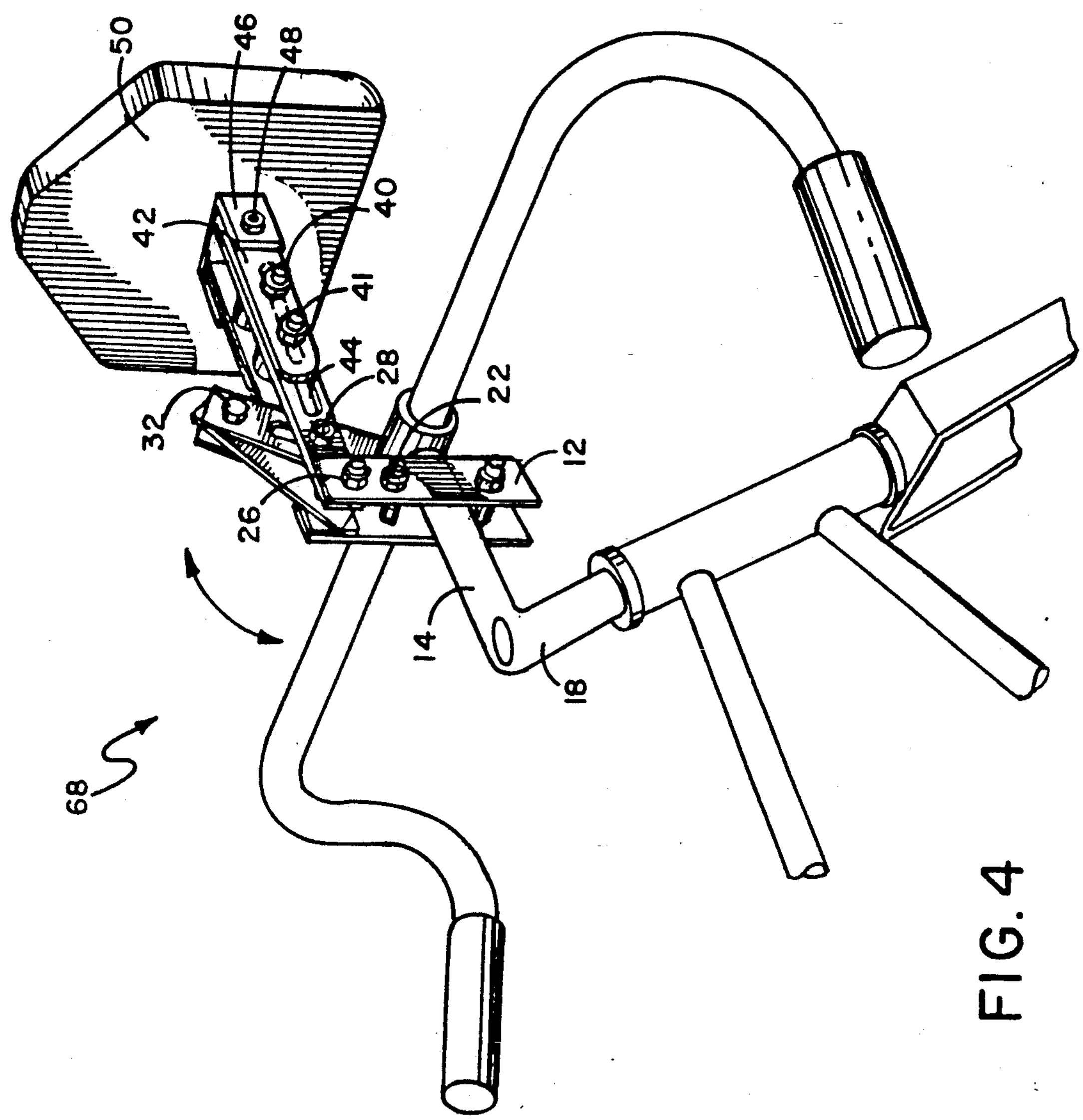
FIG. 4 illustrates a side view of the chest support of this invention rotated to its forward, non-use position.

FIG. 1 illustrates bicyclist 66 in outline form on bicycle 68. In this view chest support member 50 is positioned under the sternum/clavicle area of the bicyclist. The device of this invention is seen enlarged, showing greater detail in FIG. 2 where upright member 18, extending from bicycle frame 17, extends upward to forwardly extending handle support stem 14 which in turn extends to handlebar 16. Handlebar 16 is shown to be of the type utilized on racing bikes which handlebars curve downward. It should be noted that the device of this invention can be used on any type of bicycle with any type of handlebars including those with Aerobar-type elbow supports. The chest support of this invention can benefit the user significantly by supporting the user's chest and upper body during operation of the bicycle. Clamp member 12, seen in FIG. 2, is positioned around handle support stem 14 which stem is generally of tubular construction. Clamp member 12 can be held thereto by having a second mating portion on the other side of handle support stem 14 engaged to the first side of clamp member 12 by first bolt 22 and second bolt 20 which are located, respectively, above and below handle support stem 14. Other equivalent tightening or attachment means can be utilized to attach the clamp member onto the tubular handle support stem. At the top of clamp member 12 is lower pivot 26 onto which is pivotally attached support column 24 which extends generally upwards and, in a preferred embodiment, extends a distance of about 5½ inches. On top of support column 24 is disposed column 38 which can be adjustably positioned higher or lower on the upper end of support column 24. When column 38 is adjusted to the desired height, bolts 40 and 41, used herein as an example of tightening means, can be passed through column 38 and within slot 44 defined within column 24 and tightened against support column 24 to securely retain column 38 at the desired height. The height would be adjusted for each user of the device. The angular positioning of support column 24 is controlled by stop member 28. Stop member 28 has a lower member 30 pivotally attached at one end to lower pivot 26 and also pivotally attached at its other end by bolt 32 to upper member 34 which has a slot 36 defined therein. Bolt 29 passes through support column 24 and also through slot 36. Upper member 24 can be moved to a desired position of bolt 29 in slot 36 where bolt 29 can be tightened and stop member 28 will be locked in place, positioning stop member bottom 37 a set distance from support column 24. This set distance adjusts how far support column 24 is positioned away from handle support stem 14. By loosening bolt 29 and raising support column 24 such that bolt 29 is moved to the top of slot 36 and then retightening bolt 29, the angular position of support column 24 is changed, rotating chest support member 50 more forward as stop member 28 then holds support column 24 further away from handle support stem 14 of the bicycle. If bolt 29 is loosened and support column 24 is lowered, moving bolt 29 to the lower portion of slot 36 and then bolt 29 is then retightened, support column 24 will be positioned more rearwardly rotated. The adjustment of the positioning of support column 24 in relation to stop member 28 by adjusting the position of bolt 29 in slot 36 must be determined for each user so that chest support member 50 is properly positioned at the sternum/clavicle area for each rider. Once stop member 28 is properly adjusted, the angular positioning of support column 24 when pivoted to its use position is always maintained. When not in use, the chest support of this invention can be pushed forward, pivoting it out of the way which non-use positioning is illustrated in FIG. 4. In this view the bottom end 37 of stop member 28 has been lifted away from handle support stem 14, and the entire chest support has been manually rotated forward to position chest support member 50 over handlebar 16 such that it is not in the way of bicyclist 66 should the bicyclist have to stop the bicycle to stand up or to dismount. At the top of column 38 is upper pivot 48 on which is pivotally mounted support bracket 46. Support bracket 46 is attached to, and supports, chest support member 50 which in a preferred embodiment is approximately 5 inches in length and has a soft padded covering. The padded covering can be made of 1-inch foam with a cloth or leather-like covering thereover. Upper pivot 48 allows chest support member 50 to pivot and be positionable to the contour and position of the bicyclist's upper body.

Figure 3:
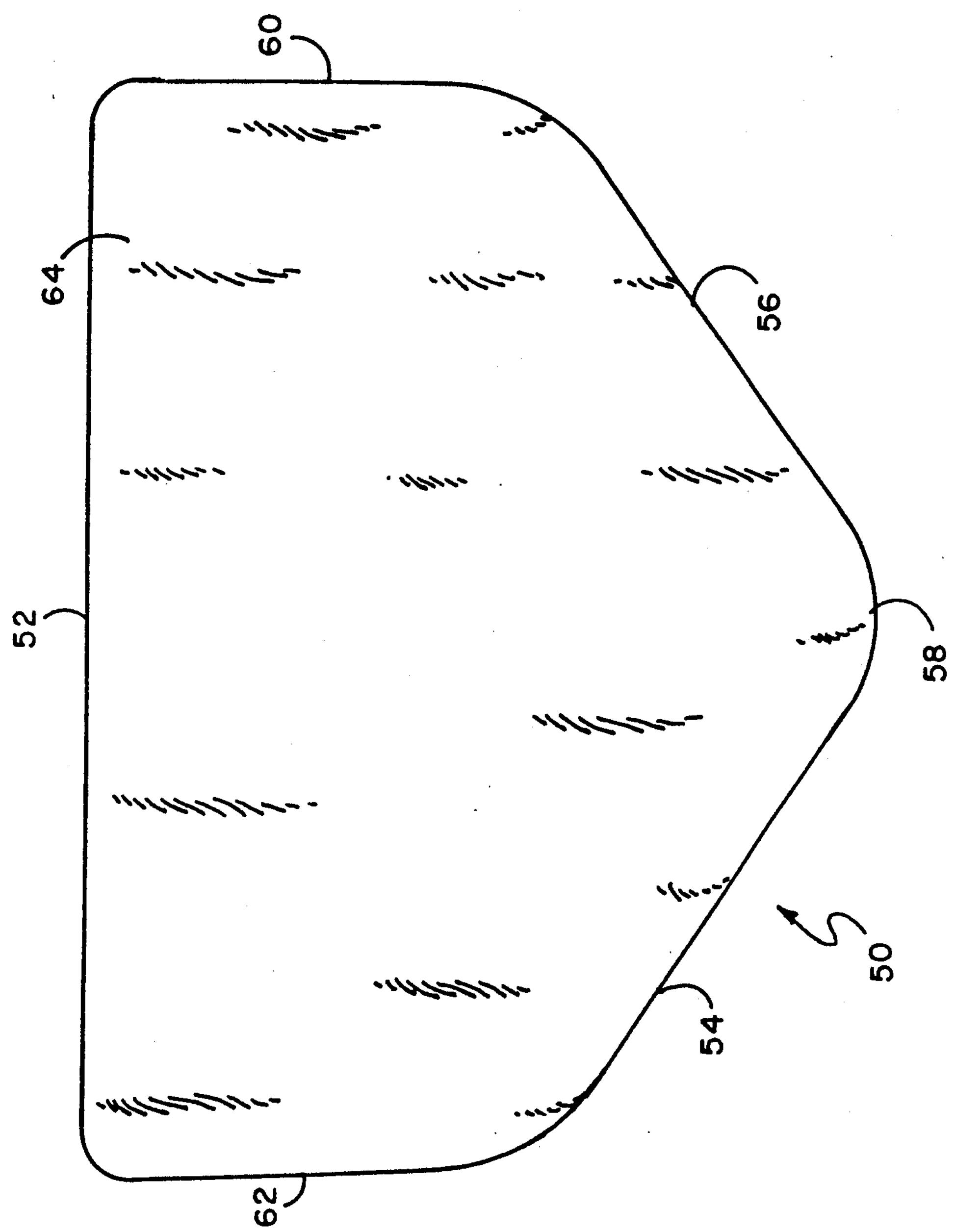
FIG. 3 illustrates a top view of the chest support member of this invention.

FIG. 3 illustrates a top view of chest support member 50 showing its padded top 64, top side 52, right side 60 and left side 62. The left and right sides of the rear portion of the chest support member are inwardly angled forming angled left side 54 and angled right side 56. Angled sides 54 and 56 meet at rear central point 58 of the chest support member, and this design of the chest support member allows female bicyclists to be anatomically accommodated so that the pad does not exert pressure on the breasts of female bicyclists. When used by female bicyclists, the angled sides of the rear portion of the chest support member would be positioned above and somewhat between the breasts of such bicyclist which design allows for comfortable usage of the device of this invention by women.

In a preferred embodiment, the device of this invention can be made of strong, light-weight metal or plastic bar or tubular material or equivalent sturdy material and the device of this invention can be produced to weigh less than 1 lb.

Although the present invention has been described with reference to particular embodiments, it will be apparent to those skilled in the art that variations and modifications can be substituted therefor without departing from the principles and spirit of the invention.

I claim:

1. A device for use with a bicycle having a handle stem, said device comprising:

a chest support member;

a support column having a top and a bottom;

means to mount said chest support member on said support column;

means disposed on said handle stem to pivotally mount said support column on said handle stem to allow movement of said chest support member to a first use position and to a second non-use position;

adjustable stop means adapted to allow said chest support member to be moved into a first use position adjusted for the positioning of said bicyclist's chest thereon, wherein said adjustable stop means comprise a stop member having an end, said stop member attached to said support column, said stop member extending a length beyond said support column for said stop member's end to rest on said handle stem when said support column is moved into its use position and means to adjust the length of the extension of said stop member from the support column depending upon the angular positioning desired of said support column to said handle stem.

2. The device of claim 1 wherein said stop member comprises a lower member having a first and a second end, said lower member being pivotally attached at its first end to said means to mount said support column on said handle stem;

a second member having a first and a second end with an elongated slot having a first and a second end defined in said second member in proximity to the second end of said second member, said second member pivotally attached at its first end to the second end of said lower member; and a bolt member passing through said support column and through said slot, said bolt tightenably engageable against said second member when in a desired position in said slot, said second member movable in relation to said support column from the first end of said slot near said first end of said second member toward the second end of said slot such that by tightening said bolt member, said support column is fixed in position in relation to said stop member wherein the end of said stop member is adapted to rest upon said handle stem and said end of said stop member is adjustable in distance from said support column to position said support column either in a more forward or rearward position as desired by the user.

* * * * *